W. MORRISON.
Seed-Planter.
No. 25,435.
Patented Sept. 13. 1859.
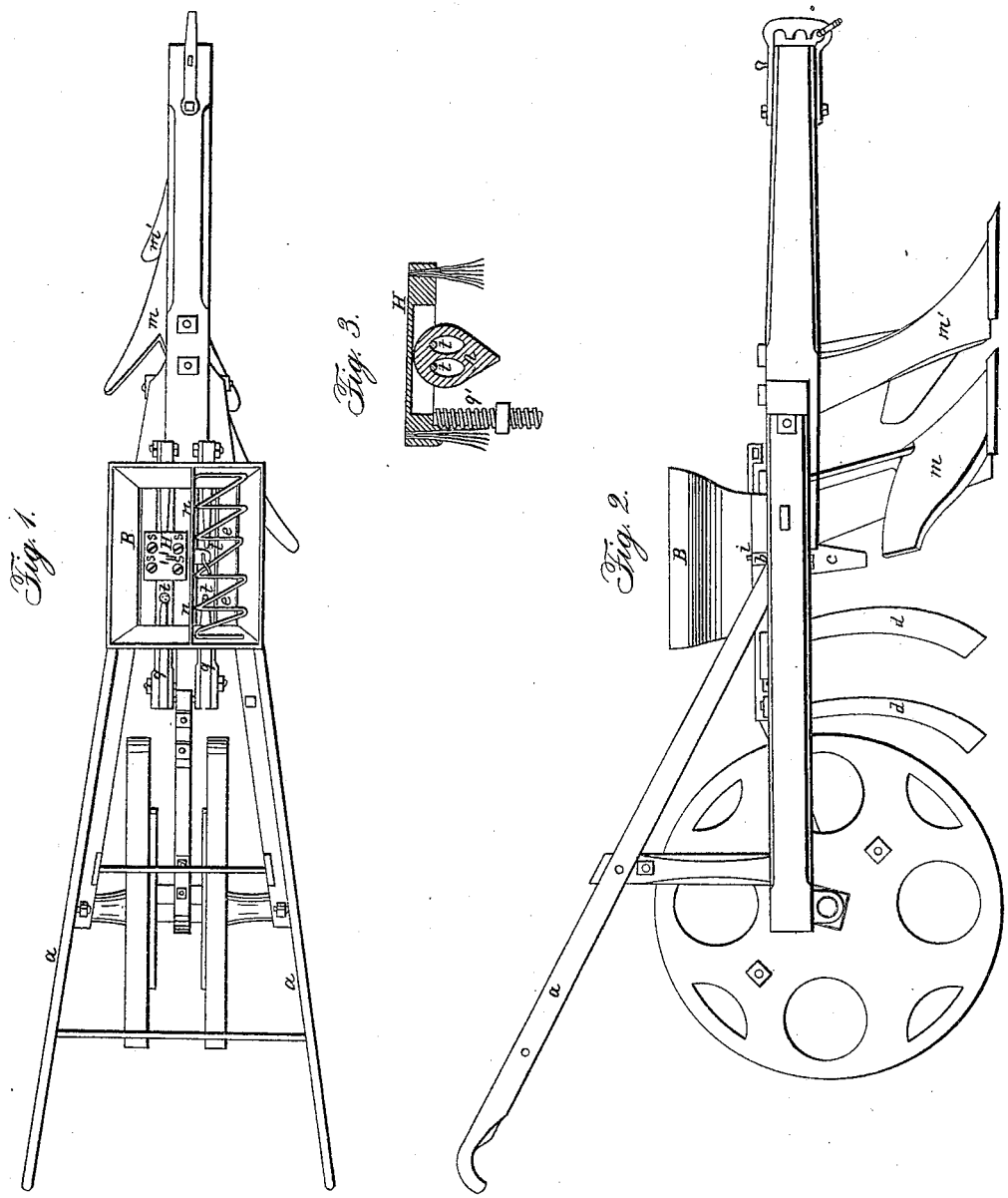
Witnesses:
Inventor:

UNITED STATES PATENT OFFICE.

WILLIAM MORRISON, OF CARLISLE, PENNSYLVANIA.

IMPROVEMENT IN CORN-PLANTERS.

Specification forming part of Letters Patent No. 25,435, dated September 13, 1859.

*To all whom it may concern:*

Be it known that I, WILLIAM MORRISON, of Carlisle, in the county of Cumberland and State of Pennsylvania, have invented a new and Improved Corn-Planter; and I do hereby declare that the following is a full, clear, and exact description of the same, reference being made to the accompanying drawings, and to the letters of reference marked thereon, in which—

Figure 1 is a top view; Fig. 2, a side or longitudinal elevation; and Fig. 3, an enlarged sectional view of the brushes, clearer, and springs, but one of the latter being represented in said view.

To enable others skilled in the art to make and use my invention, I will proceed to describe its construction and operation.

My invention consists in a peculiar construction and arrangement of the several parts of a corn-planting machine, whereby its several operations of opening the furrow, dropping the corn and fertilizer, and covering the same are more perfectly accomplished, as will be hereinafter described.

The same letters of reference, wherever they occur in the several figures, refer to the same parts.

The main frame is constructed in the triangular form usually employed in cultivators, and has the usual bearing or driving wheel, which in this instance is made double, with a crank or eccentric arranged between its two parts for giving motion to the slides of the machine.

$m \; m'$ are the mold-boards, the one, $m'$, being placed in advance of the other and in line therewith. These mold-boards are arranged to throw the furrow in opposite ways. This plan, unlike the double mold-board commonly in use, is not liable to choke. The double mold-board presents so much surface to the ground that the loose sods and stubble, having a chance to pass to either side, are apt to fly against the beam and throw the shares out of the ground, while in the single mold-board they pass to the side. Thus by having two distinct mold-boards set in line and running in the same furrow, the sods and stubble passing to the side of the first, the second, following directly in the rear, cannot choke, the front having opened the way. The shares having thus cut a good mold at the bottom of the furrow at both sides, the covering is effected by two adjustable cutters, $d \; d$. Said cutters can be turned out or in for the purpose of throwing more or less ground on the corn and run close along the inside edges of the mold of the furrow, thus covering the corn with fine mold. The dropping is effected by slides $q \; q$, reciprocated by a pitman-crank and driving-wheels in the usual manner.

The hopper B has a partition, $n \; n$, to separate the corn and plaster. The top of the hopper can be separated from the bottom for the purpose of adjusting the slide and brush, being held to the bottom by the small pins $i$. These pins pass through the upper ends of two bolts, passing down through the side beams and holding the hopper firmly to the frame by nuts on the under side.

The slides have each two holes, $t \; t$. These holes can be made larger or smaller, as desired, by shifting the middle pieces of the slides, thus superseding the necessity of a change of slides, as is generally done in other planters.

The brush H is made double and placed in the middle of the hopper, secured to the slide and bottom of the hopper by four screws, $s \; s \; s \; s$, passing through spiral springs $q'$. The corn is carried under the brush of the slide and falls through the spout C in the usual manner. A clearer, N, to prevent the grains from sticking in the holes of the slide, is fixed in the under side of the brush-frame. Said clearer is suspended loosely on two staples, $l \; l$. As the slide moves back and forth the pointed end of the clearer drops into the holes, pressing out the grains which might chance to stick in them. The plaster and guano are dropped with the same kind of slide used for the corn.

The bottom of the hopper under the slide is made concave to prevent the slide from sticking when the plaster is moist, and a spring-wire, $e \; e$, is attached to the slide $q$. This wire is moved backward and forward by the movement of the slide, thereby preventing the plaster from arching in the upper part of the hopper, the whole making an effectual plaster apparatus.

Having thus fully described my invention, what I claim as new, and desire to secure by Letters Patent, is—

A corn-planter constructed substantially as shown and specified—that is to say, with the mold-boards $m$ $m'$, adjustable cutters or coverers $d$ $d$, hopper B, slides $q$ $q$, and clearers N and $e$, when these several parts are constructed and arranged for joint operation in the manner and for the purpose described.

WM. MORRISON.

Witnesses:
   JOHN LEE,
   EDGAR LEE.